United States Patent
Power et al.

(10) Patent No.: US 10,052,923 B2
(45) Date of Patent: Aug. 21, 2018

(54) TIRE INFLATION SYSTEM WITH PERISTALTIC PUMP

(71) Applicant: ArvinMeritor Technology, LLC, Troy, MI (US)

(72) Inventors: Michael Andrew Power, Troy, MI (US); Christopher Keeney, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 850 days.

(21) Appl. No.: 14/011,068

(22) Filed: Aug. 27, 2013

(65) Prior Publication Data

US 2015/0059947 A1    Mar. 5, 2015

(51) Int. Cl.
*B60C 23/12*    (2006.01)

(52) U.S. Cl.
CPC .................................. *B60C 23/12* (2013.01)

(58) Field of Classification Search
CPC ........ B60C 23/004; B60C 23/10; B60C 23/12
USPC ........................................ 152/418, 419, 421
See application file for complete search history.

(56) References Cited

U.S. PATENT DOCUMENTS

| | | | | |
|---|---|---|---|---|
| 2,591,340 A * | 4/1952 | Deitz | ...................... | B60C 23/16 152/418 |
| 4,434,833 A * | 3/1984 | Swanson | ............... | B60C 23/003 141/38 |
| 4,922,984 A * | 5/1990 | Dosjoub | ............... | B60C 23/004 152/415 |
| 5,203,391 A * | 4/1993 | Fox | ....................... | B60C 23/003 152/415 |
| 6,145,559 A * | 11/2000 | Ingram, II | ............ | B60C 23/003 152/417 |
| 6,161,565 A * | 12/2000 | Conroy, Sr. | ........... | B60C 23/004 137/224 |
| 6,994,136 B2 * | 2/2006 | Stanczak | ................. | B60C 23/12 152/418 |
| 7,051,585 B2 * | 5/2006 | Claussen | ............... | B60C 23/003 152/418 |
| 7,931,061 B2 | 4/2011 | Gonska et al. | | |
| 8,746,306 B2 * | 6/2014 | Hinque | ................. | B60C 19/002 152/419 |
| 8,747,084 B2 * | 6/2014 | Richardson | ......... | F04B 43/1238 417/476 |
| 8,763,661 B2 * | 7/2014 | Richardson | ............. | B60C 23/12 152/415 |
| 9,039,386 B2 * | 5/2015 | Richardson | ............. | F04C 25/00 417/221 |
| 2002/0104374 A1 * | 8/2002 | Merendino, Sr. | ...... | B60C 23/004 73/146.3 |
| 2012/0020822 A1 * | 1/2012 | Richardson | ......... | F04B 43/1238 417/477.2 |
| 2012/0186714 A1 * | 7/2012 | Richardson | ............. | B60C 23/12 152/419 |

(Continued)

OTHER PUBLICATIONS

Meritor an ArvinMeritor brand, Meritor Tire Inflation System (MTIS) by PSI (TM), including Meritor ThermALERT (TM), PB-9999, Revised May 2007.

*Primary Examiner* — James A Shriver, II
*Assistant Examiner* — Vaughn Coolman
(74) *Attorney, Agent, or Firm* — Brooks Kushman P.C.

(57) ABSTRACT

A tire inflation system having a peristaltic pump. The peristaltic pump may output a pressurized gas when a flexible tube of the peristaltic pump rotates with a wheel end assembly about an axis.

19 Claims, 2 Drawing Sheets

(56) References Cited

U.S. PATENT DOCUMENTS

| | | | | |
|---|---|---|---|---|
| 2012/0234447 | A1* | 9/2012 | Narloch | B60C 23/10 152/418 |
| 2013/0251552 | A1* | 9/2013 | Richardson | F04C 25/00 417/321 |
| 2013/0251553 | A1* | 9/2013 | Richardson | F04C 25/00 417/321 |
| 2014/0260969 | A1* | 9/2014 | Richardson | B60S 5/043 95/46 |
| 2015/0107742 | A1* | 4/2015 | Knapke | B60C 23/10 152/416 |

* cited by examiner

TIRE INFLATION SYSTEM WITH PERISTALTIC PUMP

TECHNICAL FIELD

This patent application relates to a tire inflation system having a peristaltic pump.

BACKGROUND

A tire inflation system is disclosed in U.S. Pat. No. 8,763,661.

SUMMARY

In at least one embodiment, a tire inflation system is provided. The tire inflation system may include a spindle, a wheel end assembly, a peristaltic pump, and a conduit. The spindle may extend along an axis. The wheel end assembly may be rotatably disposed on a spindle and may rotate about the axis with respect to the spindle. The peristaltic pump may have a flexible tube and a displacement member. The flexible tube may rotate about the axis with the wheel end assembly. The displacement member may be disposed proximate the spindle. The flexible tube may be occluded by deformation of the flexible tube by the displacement member when the flexible tube rotates about the axis, thereby causing the peristaltic pump to output a pressurized gas. The conduit may supply the pressurized gas from the peristaltic pump to a tire.

In at least one embodiment, a tire inflation system is provided. The tire inflation system may include a spindle, an axle shaft, a peristaltic pump, and a conduit. The spindle may have a hole. The axle shaft may extend through the hole and may rotate about an axis with respect to the spindle. The axle shaft may have an axle flange disposed proximate a distal end. The peristaltic pump may be disposed proximate the axle flange. The peristaltic pump may include a flexible tube and a displacement member. The flexible tube may rotate about the axis with the axle shaft. The displacement member may extend around the spindle. The flexible tube may be occluded by deformation of the flexible tube by the displacement member when the flexible tube rotates about the axis, thereby causing the peristaltic pump to output a pressurized gas. The conduit may supply the pressurized gas from the pump to a tire.

In at least one embodiment a tire inflation system is provided. The tire inflation system may include a spindle, a hub, a peristaltic pump, and a conduit. The spindle may extend along an axis. The hub may be rotatably disposed on the spindle and may rotate about the axis. The peristaltic pump may be disposed proximate the hub. The peristaltic pump may include a flexible tube and a displacement member. The flexible tube may rotate about the axis with the hub. The displacement member may be mounted to the spindle. The flexible tube may be occluded by deformation of the flexible tube by the displacement member when the flexible tube rotates about the axis and about the displacement member, thereby causing the peristaltic pump to output a pressurized gas. The conduit may supply the pressurized gas from the pump to a tire.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
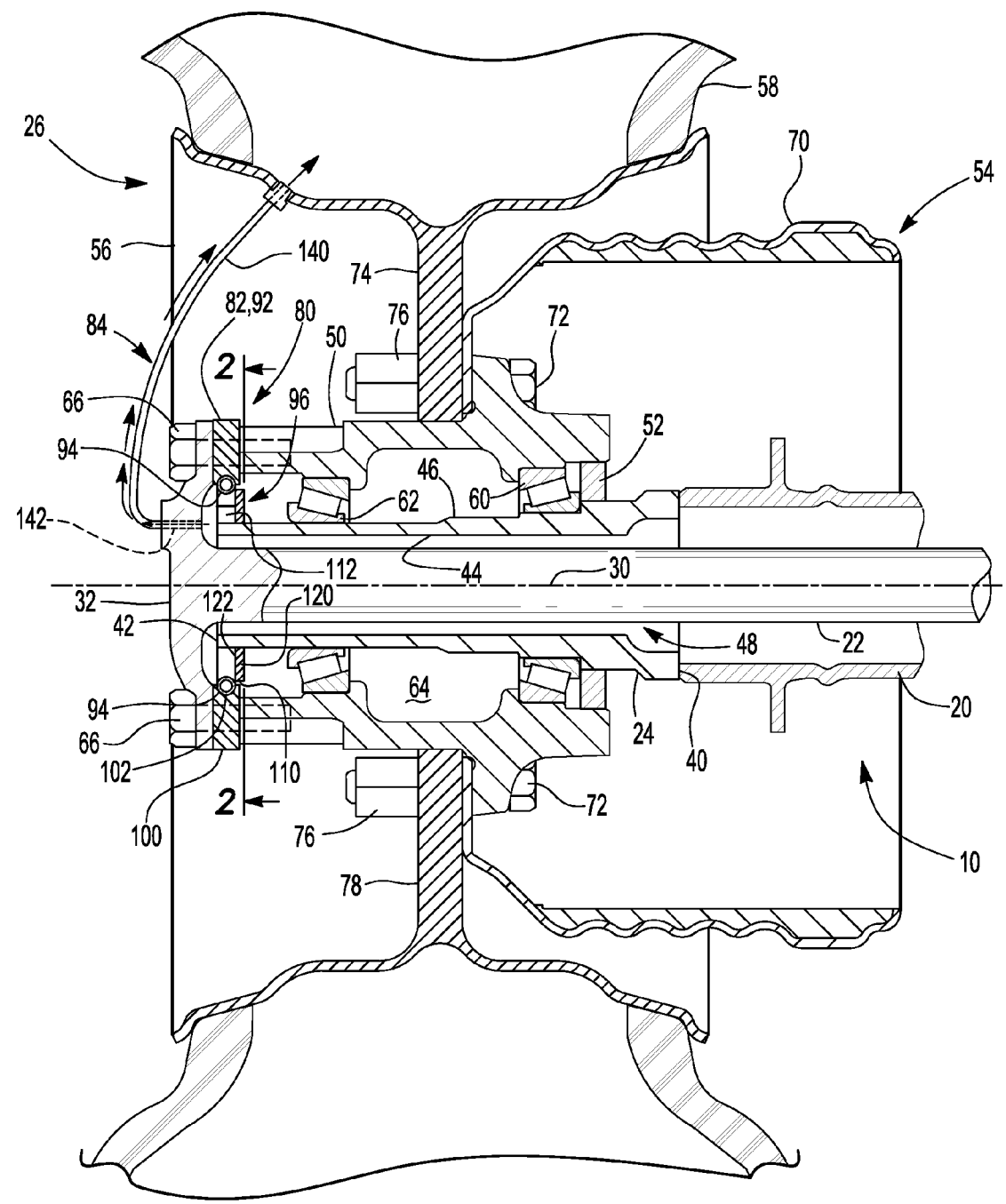
FIG. 1 is a section view of an exemplary wheel end assembly having a tire inflation system and a pump.

Referring to FIG. 1, a portion of an exemplary axle assembly 10 is shown. The axle assembly 10 may be provided with a motor vehicle like a truck, bus, farm equipment, military transport or weaponry vehicle, or cargo loading equipment for land, air, or marine vessels.

The axle assembly 10 may be configured as a drive axle that may receive torque from a power source, such as an internal combustion engine or electric motor. Alternatively, the axle assembly 10 may be configured as a non-drive axle in one or more embodiments. The axle assembly 10 may or may not be steerable. In a drive axle configuration, the axle assembly 10 may include an axle housing 20, an axle shaft 22, a spindle 24, and a wheel end assembly 26.

The axle housing 20 may receive various components of the axle assembly 10. In addition, the axle housing 20 may facilitate mounting of the axle assembly 10 to the vehicle. The axle housing 20 may define a cavity that may receive at least a portion of the axle shaft 22.

The axle shaft 22 may provide torque to the wheel end assembly 26 to propel the vehicle. For instance, the axle shaft 22 may be connected at a first end to a vehicle drivetrain component, like a differential or input shaft, and may be coupled to the wheel end assembly 26 at a second end. In at least one embodiment, the axle shaft 22 may extend along and may rotate about an axis 30. Alternatively, the axle shaft 22 may be configured for use with an independent suspension system and may have multiple shaft segments and/or joints, such as constant-velocity joints, that may facilitate relative movement between the first end and the wheel end assembly 26. The axle shaft 22 may include an axle flange 32 disposed at a distal end. The axle flange 32 may facilitate mounting of the wheel end assembly 26 to the axle shaft 22. In a non-drive axle configuration, the axle shaft 22 may be omitted.

The spindle 24 may be provided with or may be fixedly positioned with respect to the axle assembly 10. The spindle 24 may generally extend along but may not rotate about the axis 30. In a drive axle configuration, the spindle 24 may include a first end surface 40, a second end surface 42, an internal surface 44, an external surface 46, and a hole 48. In a non-drive axle configuration, the internal surface 44 and the hole 48 may be omitted. Moreover, in a steerable non-drive axle configuration, the spindle 24 may be provided with or may be fixedly positioned with respect to a steering knuckle rather than the axle housing 20. The first end surface 40 may be disposed proximate or may engage the axle housing 20. The second end surface 42 may be disposed opposite the first end surface 40 and may be located near the axle flange 32. The internal surface 44 may extend between the first end surface 40 and the second end surface 42 and may at least partially define the hole 48 through which the axle shaft 22 may extend. As such, the spindle 24 may be spaced apart from the axle shaft 22 to permit the axle shaft 22 to rotate about the axis 30. The external surface 46 may be disposed opposite the internal surface 44. The external surface 46 of the spindle 24 may support one or more wheel bearings that may rotatably support the wheel end assembly 26 as will be discussed in more detail below.

The wheel end assembly 26 may be rotatably coupled to the axle shaft 22. The wheel end assembly 26 may include a hub 50, a wheel end seal assembly 52, a brake subsystem 54, a wheel 56, and a tire 58.

The hub 50 may be rotatably disposed on the spindle 24. For instance, one or more wheel bearings may be mounted on spindle 24 and may rotatably support the hub 50. In FIG. 1, a first wheel bearing 60 and a second wheel bearing 62 are provided in a cavity 64 that is located between the spindle 24 and the hub 50. The first wheel bearing 60 may be disposed inboard or further from the second end surface 42 than the second wheel bearing 62. As such, the hub 50 may be configured to rotate about the axis 30. In a drive axle configuration, the axle flange 32 may be coupled to the hub 50 with one or more fasteners 66. As such, the hub 50 may rotate with the axle shaft 22. In a non-drive axle configuration, the hub 50 may not be coupled to an axle shaft 22 or axle flange 32.

The wheel end seal assembly 52 may be disposed between the spindle 24 and the hub 50. The wheel end seal assembly 52 may inhibit contaminants from entering the cavity 64 and may help retain lubricant in the cavity 64. In at least one embodiment, the wheel end seal assembly 52 may be fixedly disposed with respect to the hub 50 and may rotate about the axis 30 and with respect to the spindle 24.

The brake subsystem 54 may be adapted to slow or inhibit rotation of at least one associated wheel 56. For example, the brake subsystem 54 may be configured as a friction brake, such as a drum brake or a disc brake. In FIG. 1, a portion of the brake subsystem 54 is shown with a drum brake configuration. In a drum brake configuration, a brake drum 70 may be fixedly disposed on the hub 50 with one or more fasteners 72, such as wheel lug studs. The brake drum 70 may extend continuously around brake shoe assemblies (not shown) that may be configured to engage the brake drum 70 to slow rotation of an associated wheel 56.

The wheel 56 may be fixedly disposed on the hub 50. For example, the wheel 56 may be mounted on the hub 50 via the fasteners 72. More specifically, the wheel 56 may have a wheel mounting flange 74 that may have a set of holes that may each receive a fastener 72. A lug nut 76 may be threaded onto each fastener to secure the wheel 56 to the fasteners 72 and the hub 50. The lug nut 76 may engage or may be disposed proximate an outboard side 78 of the wheel mounting flange 74 that faces way from the brake drum 70 or toward the axle flange 32. The wheel 56 may be configured to support the tire 58. The tire 58 may be a pneumatic tire that may be inflated with a pressurized gas or pressurized gas mixture.

A tire inflation system 80 may be associated with the wheel end assembly 26. The tire inflation system 80 may be disposed on the vehicle and may be configured to provide a pressurized gas or pressurized gas mixture to one or more tires 58. For clarity, the term "pressurized gas" may refer to either a pressurized gas or a pressurized gas mixture. The tire inflation system 80 may include a control system that may monitor and control the inflation of one or more tires 58, a peristaltic pump 82, and a gas supply subsystem 84.

The peristaltic pump 82 may be a positive displacement pump that may be configured to pressurize and supply a volume of a pressurized gas or pressurized gas mixture, like air or nitrogen. The peristaltic pump 82 may provide a pressurized gas at a pressure that may be greater than or equal to a desired inflation pressure of a tire 58. As such, the peristaltic pump 82 may inflate a tire 58 or maintain a desired tire pressure. In addition, the peristaltic pump 82 may be configured to provide fixed or variable displacement. A variable displacement configuration may adjust the volume and/or flow rate of pressurized gas that is output from the peristaltic pump 82. Pump displacement may be adjusted electrically, such as with the control system, and/or mechanically, such as via pressure feedback, and may reduce parasitic losses or energy consumption when the peristaltic pump 82 is not in use or is supplying less pressurized gas.

Figure 3:
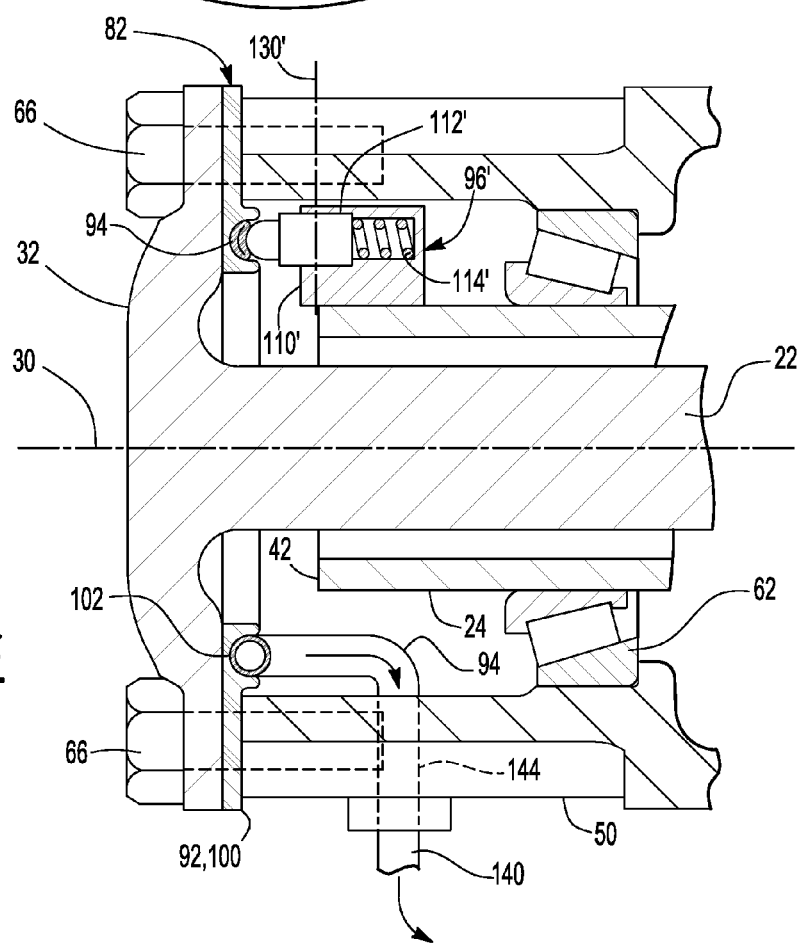
FIG. 3 is a magnified section view of another embodiment of a wheel end assembly having a tire inflation system.

The peristaltic pump 82 may be disposed proximate the wheel end assembly 26 and may be disposed in the cavity 64. In addition, at least a portion of the peristaltic pump 82 may be configured to rotate about the axis 30. As such, the peristaltic pump 82 may be disposed proximate and may rotate with the axle shaft 22, axle flange 32, and/or hub 50 in one or more embodiments. Rotation of the peristaltic pump 82 about the axis 30 may cause the peristaltic pump 82 to output pressurized gas as will be discussed in more detail below. The peristaltic pump 82 or a portion thereof may be spaced apart from and may rotate with respect to the spindle 24. In FIGS. 1 and 3, the peristaltic pump 82 is generally disposed between the axle flange 32 and the second end surface 42 of the spindle 24. In at least one embodiment, the peristaltic pump 82 may include an inlet 90, a pump housing 92, a flexible tube 94, and a displacement member 96.

The inlet 90 may receive a gas or gas mixture to be pressurized by the peristaltic pump 82. The inlet 90 may extend through the pump housing 92 and may be fluidly connected to the flexible tube 94. The inlet 90 may be disposed in the cavity 64 of the wheel end assembly 26 or may extend outside the cavity 64. The air or gas supplied to the peristaltic pump 82 may be somewhat shielded from environmental contaminants outside the wheel end assembly 26 when the inlet 90 is disposed in the cavity 64. The air or gas supplied to the peristaltic pump 82 may not be exposed to lubricant in the cavity 64 when the inlet 90 is disposed outside the cavity 64.

Figure 2:
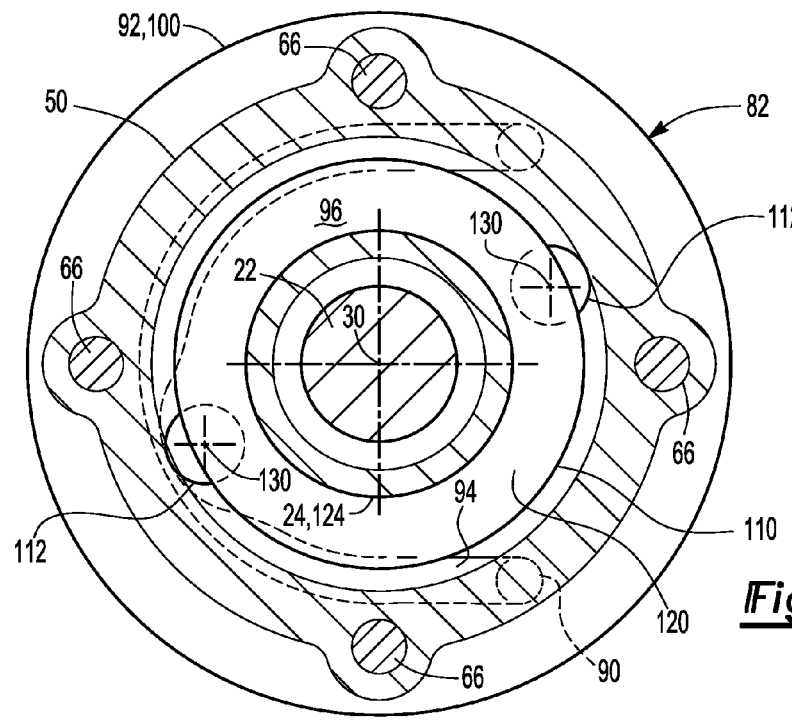
FIG. 2 is a full section view of the wheel end assembly along section line 2-2 in FIG. 1.

The pump housing 92 may receive various components of the peristaltic pump 82. In addition, the pump housing 92 may facilitate mounting of the peristaltic pump 82 to the wheel end assembly 26. For instance, the pump housing 92 may be mounted to the axle shaft 22, axle flange 32 and/or the hub 50 in one or more embodiments. As such, the pump housing 92 may rotate about the axis 30 and with respect to the spindle 24. As is best shown in FIGS. 1 and 2, the pump housing 92 may have a pump housing flange 100 and a channel 102.

The pump housing flange 100 may be disposed between the axle flange 32 and the hub 50. In at least one embodiment, the pump housing flange 100 may have a plurality of holes that each receive a fastener 66 to couple the pump housing 92 to the wheel end assembly 26.

The channel 102 may be configured to receive the flexible tube 94. The channel 102 may be disposed between the axis 30 and the pump housing flange 100 and may be spaced apart from the axle shaft 22 and/or the spindle 24. The channel 102 may extend along an arc or may be radially disposed with respect to the axis 30. The channel 102 may receive the flexible tube 94 such that the flexible tube 94 protrudes from the channel 102 toward the axis 30 such that is may be engaged by the displacement member 96.

The flexible tube 94 may be configured as a generally cylindrical tube or hose that may receive gas from the inlet 90. In addition, the flexible tube 94 and may have an outlet that may be fluidly connected to the gas supply subsystem 84. The flexible tube 94 may extend partially around the axis 30 and may be spaced apart from the spindle 24. The flexible tube 94 may be disposed in the channel 102 such that the flexible tube 94 rotates with the pump housing 92 about the axis 30 and/or about the displacement member 96. The flexible tube 94 may be occluded by the displacement member 96 as the flexible tube 94 rotates with the wheel end assembly 26 about the axis 30.

The displacement member 96 may be disposed proximate or may engage the spindle 24. The displacement member 96 may deform the flexible tube 94 such that the flexible tube is pinched closed to occlude the flexible tube 94 when the flexible tube 94 rotates about the axis 30. Occlusion of the flexible tube 94 may exert force on the gas or gas mixture in the flexible tube 94, thereby pressurizing and pumping the gas or gas mixture through the flexible tube 94. The displacement member 96 may be fixedly disposed on the spindle 24. As such, the displacement member 96 may remain in a stationary position with respect to the spindle 24 when the axle shaft 22 and/or wheel assembly 26 rotates about the axis 30.

The displacement member 96 may be provided in various configurations. Referring to FIGS. 1 and 2, an example of a displacement member 96 that radially occludes the flexible tube 94 is shown. The displacement member 96 may include a mounting member 110 and at least one roller 112.

The mounting member 110 may extend continuously around the spindle 24 and the axis 30 in one or more embodiments. In at least one embodiment, the mounting member 110 may be fixedly positioned with respect to the spindle 24 and may include a first surface 120, a second surface 122, and a mounting hole 124.

The first surface 120 may face toward the second wheel bearing 62. The first surface 120 may extend substantially perpendicular to the axis 30 in one or more embodiments.

The second surface 122 may be disposed opposite the first surface 120. The second surface 122 may face toward the flexible tube 94.

The mounting hole 124 may extend from the first surface 120 to the second surface 122. The mounting hole 124 may receive the spindle 24 and may be coaxially disposed with the axis 30.

At least one roller 112 may be provided to engage and deform the flexible tube 94. In the embodiment shown in FIGS. 1 and 2, two rollers 112 are provided that may be spaced apart from each other and disposed on opposite sides of the spindle 24. Each roller 112 may be disposed between the spindle 24 and the flexible tube 94. For example, each roller 112 may be disposed proximate a surface of the mounting member 110, such as the second surface 122. Each roller 112 may be configured to rotate about a roller axis 130. The roller axis 130 may be spaced apart from the axis 30 and may be fixedly positioned or stationary with respect to the axis 30. The roller axis 130 may be disposed substantially parallel to the axis 30.

Referring to FIG. 2, an example of the flexible tube 94 being occluded by the roller 112 is shown. FIG. 2 is a full section view of the axle assembly 10 and is not a section of the section view shown in FIG. 1. In FIG. 2, the roller 112 located to the left of the axis 30 is shown in engagement with the flexible tube 94. This engagement causes the flexible tube 94 to be deformed outward toward the pump housing flange 100, thereby occluding the flexible tube 94. The roller 112 may move along the flexible tube 94 as the wheel end assembly 26 and flexible tube 94 rotate about or move with respect to the axis 30, thereby moving the occlusion location in the flexible tube 94 and forcing gas through the flexible tube 94. The rollers 112 may be positioned such that the flexible tube 94 is occluded by at least one roller 112 at any rotational position to inhibit pressurized gas from flowing toward the inlet 90.

Referring to FIG. 3, an example of a displacement member 96' that axially occludes the flexible tube 94 is shown. The displacement member 96' may include a mounting member 110' and at least one roller 112', and a biasing member 114'.

The mounting member 110' may be fixedly disposed on the spindle 24 or fixedly positioned with respect to the spindle 24. The mounting member 110' may support the roller 112'. In FIG. 3, the roller 112' is supported between a distal end or the second end surface 42 of the spindle 24 and the flexible tube 94.

At least one roller 112' may be provided to engage and deform the flexible tube 94. The roller 112' may have a similar configuration and function as the one or more rollers 112 discussed above. In FIG. 3, a single roller 112' is shown that may be disposed between the mounting member 110' and the flexible tube 94. The roller 112' may be configured to rotate about a roller axis 130'. The roller axis 130' may be spaced apart from the axis 30 and may be fixedly positioned or stationary with respect to the axis 30. In FIG. 3, the roller axis 130' may be radially disposed with respect to the axis 30 or oriented substantially perpendicular to the axis 30. As such, the roller 112' may compress or deform the flexible tube 94 axially in an outboard direction toward the axle flange 32 or away from the wheel mounting flange 74.

The biasing member 114' may bias the roller 112' toward the flexible tube 94. The biasing member 114' may have any suitable configuration. In FIG. 3, the biasing member 114' is configured as a spring that may exert a biasing force on the roller 112' in a direction that is generally parallel to the axis 30. The biasing member 114' may be mounted on the mounting member 110'.

The gas supply subsystem 84 may fluidly connect the peristaltic pump 82 to the tire 58. The gas supply subsystem 84 may include one or more conduits 140, such as a hose, tubing, pipe, or combinations thereof. The conduit 140 may receive pressurized gas from the peristaltic pump 82 and may supply pressurized gas to the tire 58. In addition, one or more valves may be associated with or provided with the conduit 140 to enable or disable the flow of the pressurized gas from the peristaltic pump 82 to one or more tires 58. The flow of pressurized gas is represented by the arrows in the conduits in FIGS. 1 and 3. In addition, one or more valves, such as a check valve, may be integrated with the peristaltic pump 82 to inhibit backflow of pressurized gas.

The conduit 140 may be routed from the peristaltic pump 82 to the tire 58 in various ways. In FIG. 1, the conduit 140 is routed through an axle flange hole 142 that may be configured as a through hole in the axle flange 32. As such, the conduit 140 may be routed around the perimeter of the axle flange 32 to the tire 58. In FIG. 3, the conduit 140 is routed through a hub hole 144 that may be configured as a through hole in the hub 50. The conduit routing configurations in FIGS. 1 and 3 may be interchanged in one or more embodiments.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tire inflation system comprising:
   a spindle that extends along an axis;
   a wheel end assembly that is rotatably disposed on the spindle and configured to rotate about the axis with respect to the spindle, wherein the wheel end assembly has an axle shaft that extends through a hole in the spindle, the axle shaft having an axle flange disposed at a distal end;
   a peristaltic pump that includes:
      a flexible tube that rotates about the axis with the wheel end assembly, wherein the axle shaft rotates the flexible tube about the axis and the peristaltic pump is disposed between the axle flange and the spindle such that the flexible tube is spaced apart from the spindle; and
      a displacement member that is disposed proximate the spindle, wherein the flexible tube is occluded by deformation of the flexible tube by the displacement member when the flexible tube rotates about the axis, thereby causing the peristaltic pump to output a pressurized gas; and
   a conduit that supplies the pressurized gas from the peristaltic pump to a tire.

2. The tire inflation system of claim 1 wherein the displacement member includes a mounting member that is fixedly positioned with respect to the spindle and a roller that is disposed on the mounting member and configured to rotate about a roller axis, wherein the roller axis is stationary with respect to the axis.

3. The tire inflation system of claim 2 wherein the mounting member has a mounting hole that receives the spindle and wherein the mounting member extends continuously around an external surface of the spindle.

4. The tire inflation system of claim 2 wherein the flexible tube is occluded by the roller as the flexible tube moves with respect to the roller axis.

5. The tire inflation system of claim 2 wherein the roller axis is spaced apart from the axis.

6. The tire inflation system of claim 2 wherein the displacement member further comprises a biasing member that biases the roller toward the flexible tube.

7. The tire inflation system of claim 2 wherein the roller axis extends substantially perpendicular to the axis.

8. The tire inflation system of claim 1 wherein the wheel end assembly further comprises a hub that is rotatably disposed on the spindle and fixedly positioned with respect to the axle flange, wherein the peristaltic pump is disposed on the hub.

9. A tire inflation system comprising:
   a spindle having a hole;
   an axle shaft that extends through the hole and that is configured to rotate about an axis with respect to the spindle, wherein the axle shaft includes an axle flange disposed proximate a distal end;
   a peristaltic pump that is disposed proximate the axle flange and includes:
      a flexible tube that rotates about the axis with the axle shaft; and
      a displacement member that extends around the spindle, wherein the flexible tube is occluded by deformation of the flexible tube by the displacement member when the flexible tube rotates about the axis, thereby causing the peristaltic pump to output a pressurized gas; and
   a conduit that supplies the pressurized gas from the peristaltic pump to a tire.

10. The tire inflation system of claim 9 wherein the displacement member is disposed on the spindle and includes a roller that is configured to rotate about a roller axis, wherein the roller axis is stationary with respect to the axis.

11. The tire inflation system of claim 10 wherein the roller is disposed between the spindle and the flexible tube, wherein the roller axis extends substantially parallel to the axis.

12. The tire inflation system of claim 9 wherein the displacement member further comprises a mounting member that is fixedly disposed on the spindle, wherein the mounting member has a first surface, a second surface disposed opposite the first surface, and a mounting hole that extends from the first surface to the second surface, wherein the spindle is disposed in the mounting hole.

13. The tire inflation system of claim 12 wherein the displacement member includes a pair of rollers that are disposed proximate the second surface, wherein the spindle is disposed between the pair of rollers.

14. The tire inflation system of claim 9 wherein the axle flange has an axle flange hole and wherein the conduit extends through the axle flange hole.

15. A tire inflation system comprising:
   a spindle that extends along an axis;
   a hub that is rotatably disposed on the spindle and configured to rotate about the axis, wherein the hub further comprises a hub hole;
   a peristaltic pump that is disposed proximate the hub and includes:
      a flexible tube that rotates about the axis with the hub; and
      a displacement member that is mounted to the spindle, wherein the displacement member includes a roller that rotates about a roller axis that does not move with respect to the axis, and the flexible tube is occluded by deformation of the flexible tube by the roller when the flexible tube rotates about the axis and about the displacement member, thereby causing the peristaltic pump to output a pressurized gas; and
   a conduit that supplies the pressurized gas from the peristaltic pump to a tire, wherein the conduit extends through the hub hole.

16. The tire inflation system of claim 15 wherein the roller axis is stationary with respect to the spindle.

17. The tire inflation system of claim 15 wherein the roller is disposed between the spindle and the flexible tube, wherein the roller axis extends substantially parallel to the axis.

18. The tire inflation system of claim 15 wherein the displacement member further comprises a mounting member that is fixedly disposed on the spindle and that supports the roller between a distal end of the spindle and the flexible tube.

19. The tire inflation system of claim 15 wherein the roller is disposed between the spindle and the flexible tube.

\* \* \* \* \*